US006890120B2

(12) United States Patent
Hozie

(10) Patent No.: US 6,890,120 B2
(45) Date of Patent: May 10, 2005

(54) HINGE FOR DOCKS

(76) Inventor: Wayne A. Hozie, P.O. Box 1283, Grover Beach, CA (US) 93483

( * ) Notice: Subject to any disclaimer, the term of this patent is extended or adjusted under 35 U.S.C. 154(b) by 297 days.

(21) Appl. No.: 10/102,218

(22) Filed: Mar. 20, 2002

(65) Prior Publication Data

US 2003/0177608 A1 Sep. 25, 2003

(51) Int. Cl.[7] .................................................. F16D 1/12

(52) U.S. Cl. ............................ 403/58; 403/53; 403/57; 403/157

(58) Field of Search ............................ 014/2.6, 31, 32, 014/36, 37, 43, 51, 69.5, 71.1; 016/367; 280/492, 494; 403/53, 57, 58, 62, 78, 150, 157; 405/218–221

(56) References Cited

U.S. PATENT DOCUMENTS

| | | | | | |
|---|---|---|---|---|---|
| 1,748,849 | A | * | 2/1930 | Schmidt | 312/325 |
| 2,715,314 | A | * | 8/1955 | Smith | 405/219 |
| 2,746,771 | A | * | 5/1956 | Gross | 280/494 |
| 3,850,533 | A | * | 11/1974 | Thielen | 403/58 |
| 4,066,131 | A | * | 1/1978 | Zandbergen | 172/680 |
| 4,281,848 | A | * | 8/1981 | Youngers | 280/494 |
| 4,325,564 | A | * | 4/1982 | Phipps | 280/204 |
| 4,561,797 | A | * | 12/1985 | Aldridge | 403/58 |
| 4,581,784 | A | * | 4/1986 | Rousseau et al. | 14/71.1 |
| 4,838,735 | A | * | 6/1989 | Warner | 405/220 |
| 4,945,595 | A | * | 8/1990 | Meriweather | 14/69.5 |
| 6,032,973 | A | * | 3/2000 | Flowers, Jr. | 280/494 |
| 6,227,749 | B1 | * | 5/2001 | Fujii | 403/78 |
| 2003/0156890 | A1 | * | 8/2003 | Tucker | |

* cited by examiner

*Primary Examiner*—Robert J. Sandy
*Assistant Examiner*—Ruth Rodriguez
(74) *Attorney, Agent, or Firm*—Maria Erlindo Co Sarno

(57) ABSTRACT

This invention relates to a hinge for interconnecting sections of a floating dock and for interconnecting walkways with floating docks. This hinge protects docks from being damaged by stress exerted by the side to side or up and down motion of the wave, storm or high winds. This hinge can also be used for reconstructing old damaged docks. The hinge comprises two stackable sheet of twisting members which are preferably flat, each having an arcuate front end for facilitating a twisting motion of the twisting members relative to each other, a mounting plate, and a central opening for accomodating a pivot rod; a fastener for keeping the hinge components together; and, preferably washers to protect the outside surfaces of the twisting members from abrasion. One side of the hinge preferably attaches to a dock section having a dock joint bracket while the other end preferably attaches to a plain corner bracket to allow vertical pivotal movement of the dock sections in response to wave motions. A cover is provided if a gap is formed by the space occupied by the hinge.

16 Claims, 4 Drawing Sheets

HINGE FOR DOCKS

BACKGROUND

This invention relates to a hinge for interconnecting sections of a floating dock and for interconnecting walkways with floating docks. This hinge can be used both for reconstructing docks which have been damaged by storm or high winds or for constructing new docks that can better withstand the stress exerted by the side to side or up and down motion of the dock.

Most docks have sections interconnected together by simply threading a suitably diametered rod through a pair or a series of sturdy eye bolts secured in an aligned relation to the adjoining opposed vertical faces of the dock sections or through aligned bearing openings in pairs of metal bearing plates secured to the vertical sides of the respective adjoining dock sections and projecting downwardly therefrom. These eyebolts are usually constructed on corner brackets installed at each corner of the interconnecting dock sections but more aligned eyebolts may be installed along the vertical sides of the dock sections if reinforcement is desired or necessary, for example, when the dock sections span a sizeable width. The vertical faces of the interconnecting dock sections are positioned face to face and end to end in spaced apart relation relative to one another. These types of interconnection is usually restrictive of dock movements in relation to wave actions, high winds, or heavy loads thereby resulting in structural damage to the dock after some time of usage. Reconstructing damaged docks is costly since it requires downtime, materials and labor before it again becomes operational.

This problem has been addressed by installing flexible materials covering the gap between the interconnected clock sections to allow the sections to move with respect to each other or by installing semi-flexible hinges to each adjacent dock faces. These flexible materials, usually rubber based, are however not long lasting and while they may address the up and down motion of the dock, they are not very efficient in dealing with damages caused by the side to side motion of the clock.

It is therefore and object of this invention to provide a dock hinge that will allow the interconnecting dock sections to move side to side and up and down relative to each other.

It is also an object of this invention to provide a hinge that is simple and easy to install.

It is a further object of this invention to provide a hinge that can be easily installed on old damaged docks or to replace existing hinges on functional docks to preserve the docks from damage.

SUMMARY

This invention relates to a hinge for interconnecting sections of a dock or for interconnecting walkways to a dock. The hinge comprises two stackable sheet of twisting members which are preferably flat, each having an arcuate front end for facilitating a twisting motion of the twisting members relative to each other, a mounting plate, and a central opening for accomodating a pivot rod; a fastener for keeping the hinge components together; and, preferably washers to protect the outside surfaces of the twisting members from abrasion. One side of the hinge preferably attaches to a dock section having a dock joint bracket while the other end preferably attaches to a plain corner bracket to allow vertical pivotal movement of the dock sections in response to wave motions. A cover is provided for a gap formed by the space occupied by the hinge. This cover is typically made of wood such as marine plywood laid on top of the interconnecting dock sections having an unbolted beveled arched edge on one end and a bolted beveled horizontal edge on the other end, the beveled edges extending beyond the interconnected vertical faces of the dock sections and lateral side ends coterminally aligning with the lateral side ends of the dock sections.

The hinge connects two dock sections or a walkway to a dock positioned face to face and end to end by the following steps: a) stacking an upper and a lower twisting member, each having a flat frame, a central hole, and a mounting plate in an orientation wherein the mounting plate of the upper twisting member face away from the mounting plate of the lower twisting member; b) aligning the central hole of the upper and lower twisting members; c) introducing a pivot rod through the aligned central holes; d) fastening the stacked twisting members together thereby forming an assembled hinge; and, e) mounting the assembled hinge by connecting/attaching the mounting plates to corresponding brackets on corresponding vertical faces of the dock sections or walkway. To further increase the lifetime of the hinge by preventing damages caused by abrasion, the following steps are added: between step b) and c), placing a washer having a center hole on top of the upper twisting member in such a way that the center hole aligns with the central holes of the twisting members; between d) and e) placing a washer having a center hole on the bottom of the lower twisting member in such a way that the center hole aligns with the central holes of the twisting members; and, greasing outside surfaces of a component of the hinge that comes in contact with outside surfaces of another component of the hinge. If a gap is formed between the interconnected dock sections due to the space occupied by the hinge, a covering, preferably a marine plywood, is laid over the gap to avoid injuries to dock users.

DETAILED DESCRIPTION OF THE INVENTION

Figures 1, 1A:
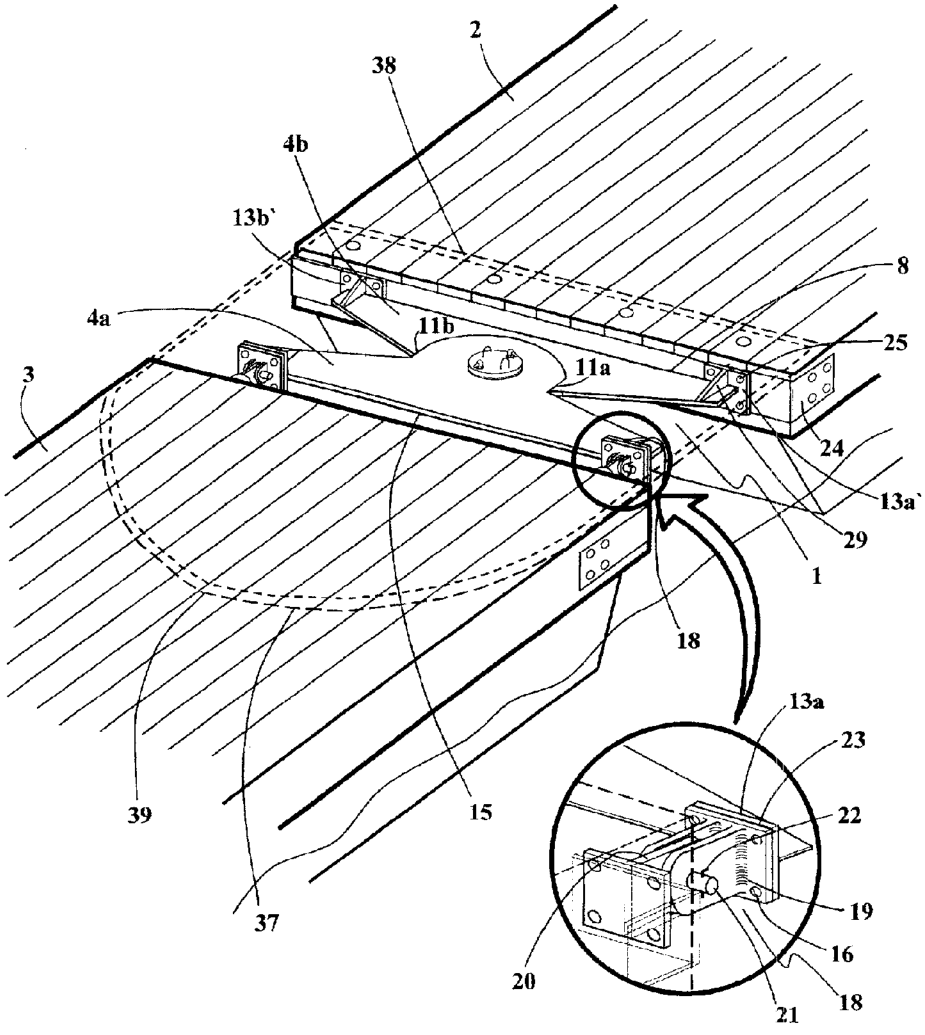
FIG. 1 is a perspective view of the hinge connecting two dock sections.
FIG. 1A is a blow up of the dock joint bracket connected to a dock section.
Figure 2:
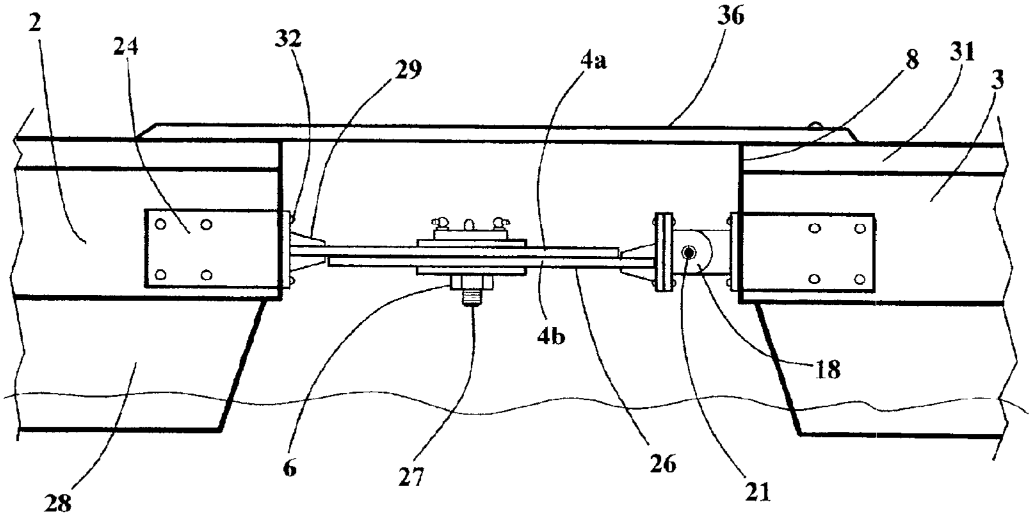
FIG. 2 is a side view of the assembled hinge connected to the dock sections including the plywood covering the gap sections above the hinge.
Figures 3, 3A:
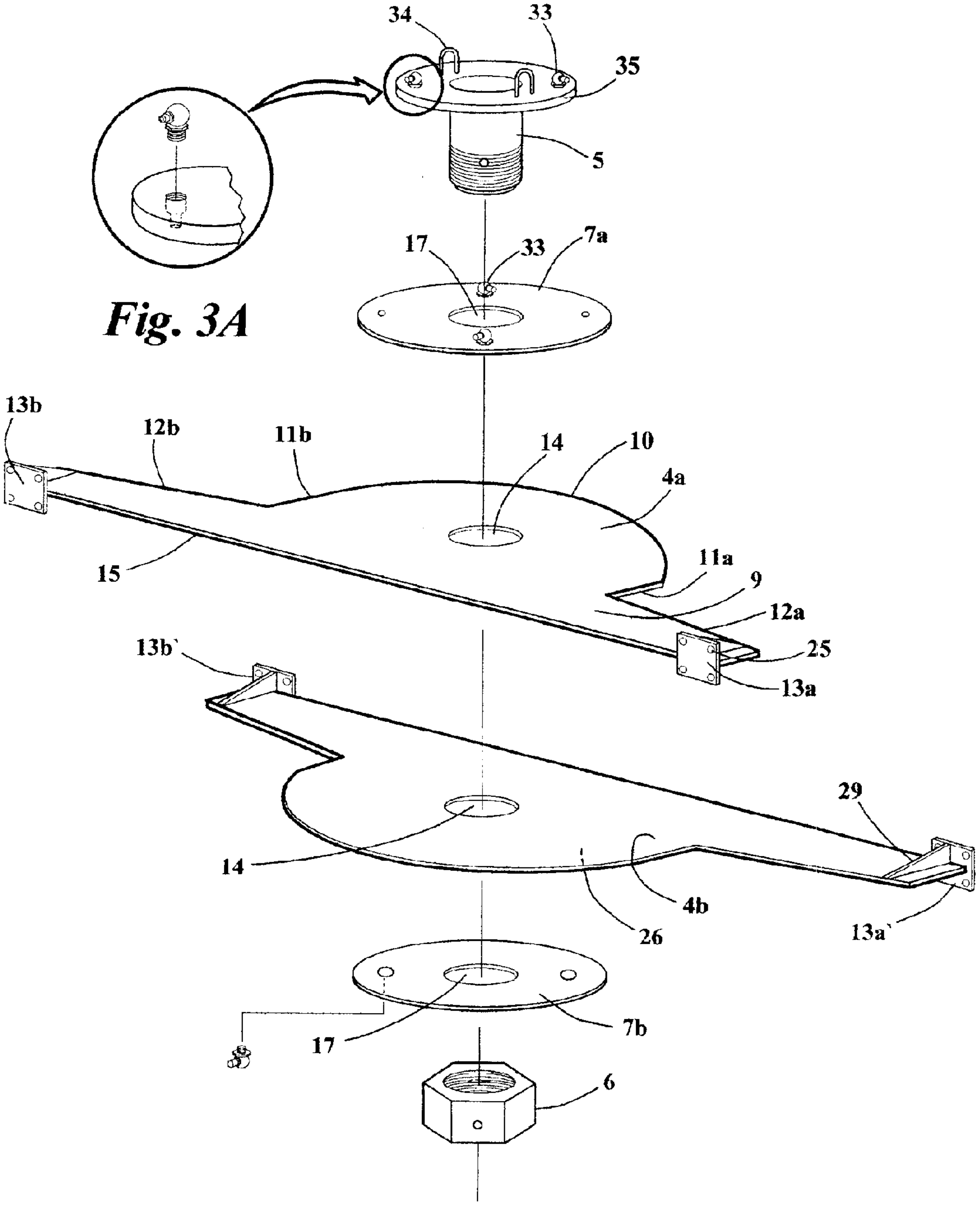
FIG. 3 is an exploded view of how the components of the hinge are assembled together.
FIG. 3A is an exploded view of a grease zerk attaching to a bolt head or washer.

Floating docks are typically constructed from pivotally interconnected dock sections positioned face to face and end to end in spaced apart relation to each other. The dock sections typically include a rectangular frame having a flat top decking formed from a plurality of deck boards secured to the top of the frame. Other docks however may be of another shape other than rectangular. The length of the deck boards typically matches the width of the frame so as to be coterminus. The hinge to pivotally interconnect one dock section to another is usually secured on a vertical face of one frame facing a corresponding vertical face of another frame as shown in FIGS. 1 and 2. Docks and dock sections come in different dimensions and the hinge proposed herein is applicable to all sizes. The dock may be constructed of concrete, wood, metal or plastic. The dock sections are usually constructed at even width increments, such as 2 ft., 3 ft., 4 ft., 5 ft., 6 ft. and so on. FIG. 1 shows the hinge 1 of the invention interconnecting two dock sections 2 and 3. FIGS. 2 and 3 shows the parts making up the hinge 1, 2 pieces of corresponding twisting members, an upper twisting member 4*a* and a lower twisting member 4*b* which are two preferably stackable flat sheets of material having an arcuate front, a horizontal base and a central opening, a pivot rod 5 which herein is exemplified by a bolt, a fastener 6 which is a nut if a bolt is used as the pivot rod and preferably two washers 7*a* and 7*b* for protecting the twisting members from rubbing on the surface of the fastener 6. As stated above, the size of the hinge 1 depend upon the width of the deck section to which the hinge will be attached. For example, for dock sections each with a length of 200 ft. and a vertical face 8 of 6 ft., for hingedly connecting together the dock sections in opposed parallel orientation, a ⅜ inch thick of twisting members 4*a* and 4*b*, ⅜ inch thick×14 inch diameter washers 7*a* and 7*b*, 4 inch diameter bolt 5 and 4 inch diameter nut 6 are suitable for use. The nut is typically locked on a side opening by a set screw. The hinge is preferably made of hot dipped galvanized hot roll iron for strength and longevity. Other materials are suitable as long as they are corrosion resistant and possess the same properties as that found in galvanized iron or galvanized steel.

The proposed hinge 1 may be installed in any type of dock. A detailed description of the construction of a dock or more specifically, a floating dock is known and is deemed unnecessary. The bolt 5, nut 6, and washers 7*a* and 7*b* used in constructing the hinge herein are conventional and commercially available, however, parts of comparable functions may be customized. The twisting members 4*a* and 4*b* and the mariner of attachments to the dock sections differentiate this hinge from conventional hinges. To allow the hinge to move up and down according with the motion of the wave and side to side with the force of the strong wind and protect the dock from breaking, it is preferably designed with two identical stackable twisting members 4*a* and 4*b* which is constructed with a flat frame 9 having an arcuate front 10 elevated by vertical sides 11*a* and 11*b* which are both in turn extended diagonally at each end by sides 12*a* and 12*b*, terminating at each end with mounting plates 13*a* and 13*b*. The base 15 opposite the arcuate front 10 of the frame is horizontal. The mounting plates 13*a* and 13*b* are positioned perpendicular to the flat frame 9 of the twisting members 4*a* and 4*b*. These mounting plates are typically welded to the twisting members. Although the figures show a preferred design for the hinge, alternate designs are possible so long as there are two stackable members that can twist from side to side relative to each other with an angular span of 30–40 degrees. Both twisting members 4*a* and 4*b* have a central hole 14 preferably located midway between the two mounting plates at each end of a twisting member and midway between the base 15 of the frame 9 and the arcuate front 10 of each twisting member. The central hole 14 of each twisting member align with each other when the twisting members are stacked or superimposed to each other.

The hinge is fully assembled before it is mounted to the opposed vertical faces 8 of the dock sections. FIG. 3 shows how the components are assembled together. Before mounting the hinge 1, the two twisting members 4*a* and 4*b* are placed on top of each other in an orientation that positions the mounting plates of 4*a* to face opposite or away from that of the mounting plates of 4*b* as shown in FIGS. 1 and 3. A washer 7*a* having a center hole 17 is preferably placed on top of the upper twisting member 4*a* in such a way that the center hole 17 aligns with the central hole 14. A pivot rod 5 is then introduced through holes 17 and 14 to provide a pivot point and to keep the twisting members together prior to the hinge being fastened together. A second washer 7*b*, having an identical center hole 17 as in washer 7*a*, is preferably installed at the bottom surface 26 of the lower twisting member 4*b*. A fastening device 6 to keep the hinge components stacked together, which in this example is a nut, is screwed on the bottom protruding threaded end 27 of the pivot rod 5 which in this example is a bolt. The receiving vertical faces 8 of the dock sections would typically have dock joint brackets 18 to which the mounting plates 13*a* and 13*b* would attach to as shown in FIGS. 1 and 2. These dock joint brackets are typically bolted to the vertical faces of the dock sections but other means of attachments known in the art may be used. There are several kinds of dock joint brackets that are available commercially. Any type that can accommodate the mounting plate can be used. The dock joint bracket 18 as shown in FIG. 1A, preferably will have a female member 19 and a male member 20 on a corner bracket, the female and male member coupled by a connecting pin 21 having a locking hairpin 22 to secure the connecting pin in place. These types of brackets are preferred because the female member 19 and the male member 20 can pivot relative to each other around the connecting pin 21 thereby allowing the interconnected dock sections to undergo vertical pivotal motion in response to momentary wave motion. As shown in FIG. 1, one pair of mounting plates 13*a* and 13*b* from the upper twisting member 4*a* are connected to corresponding back surfaces 23 of female members 19 of a pair of dock joint brackets while the other pair of mounting plates 13*a*' and 13*b*' from the lower twisting member 4*b* are connected to a corner bracket 24 without a dock joint. The mounting plates typically have holes 25 corresponding to the holes 16 of the respective brackets through which bolts 32 or other connecting devices having a longitudinal body can go through. Depending upon the position of the float 28 relative to the dock, it may be necessary to temporarily slide the float out of the way before installing the hinge.

In the assembly of hinge 1, grease is preferably applied to lessen or prevent abrasion that may be caused by friction between the rubbing contacting surfaces of the twisting members 4*a* and 4*b* or between the contacting surfaces of the washers, the fasteners and the twisting members. The washers are also preferably made of hot dipped galvanized hot roll iron. Grease zerks 33 as shown in FIGS. 3 and 3A are installed on the bolt and on the upper washer 7*a* and the lower washer 7*b* to allow periodic regreasing of the hinge preferably by use of a grease gun. The grease zerks installed on the bolt will allow grease to travel through the washers, as well, so long as there are holes in the washer corresponding to the holes of the bolt through which the grease goes through. Grease zerks are commercially available from hardware stores.

A gusset 29, preferably triangular in shape, is recommended and this is welded at each end of the twisting members at a position midway between the edges of the mounting plates. The gusset 29 is oriented perpendicular to the mounting plate and protrudes upward as shown in FIGS. 1 and 3. The gusset strengthens the attachment of the mounting plate to the frame of the twisting member as well as the attachment of the mounting plate to the dock joint bracket or corner bracket. Like the other components of the hinge, the gusset is also preferably made of hot dipped galvanized hot roll iron.

Due to the weight of hinge 1, it is preferable to install lifting brackets 34 on the bolt head 35 for easy transport. If a bolt is not used, the lifting brackets and the grease zerks above can be installed to the corresponding component used in lieu of the bolt.

When the hinge 1 is used to repair damaged docks instead of a new construction, it is simply mounted directly on the dock sections in the same manner as above. If there are existing brackets, one simply removes the old bolts on the existing brackets, move and align the corresponding holes 25 of the mounting plates to the existing holes of the bracket, and reinstall the old bolts through the mounting plate and bracket. For proper functioning, the hinge 1 should attach to one dock section having a dock joint bracket 18 and to the opposite dock section having a plain corner bracket 24.

Figure 4:
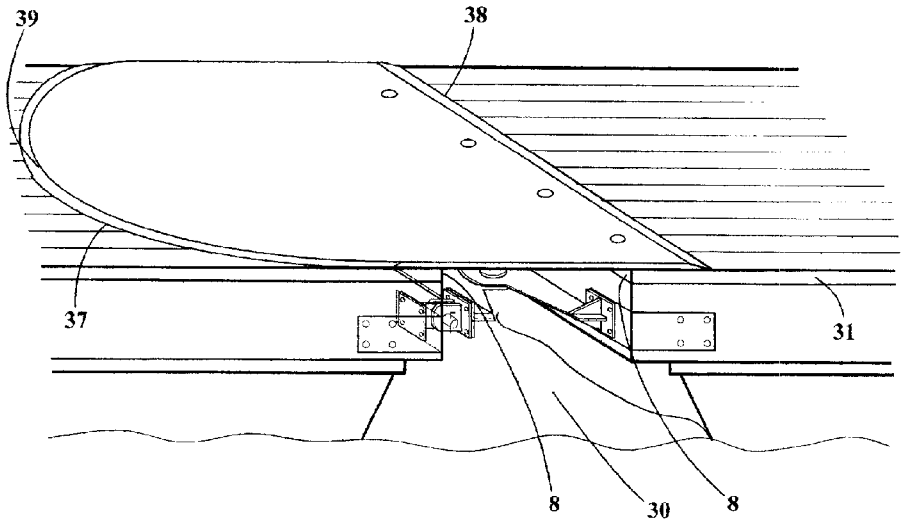
FIG. 4 is a perspective view of the cover laid on top of the decking to cover the gap formed by the installation of the hinge.

After the assembly of hinge 1, depending upon the extention of the top decking 31 there may be a gap 30 formed between the dock sections 2 and 3, corresponding to a space occupied by the hinge. To ensure that no dangerous openings or clefts are present between the dock sections where a hand or foot may be accidentally caught or pinched, thereby causing injury, the gap is covered typically with plywood, preferably a ¾ inch marine plywood which is shown in FIG. 4 and in dashed lines on FIG. 1. Metal, plastic, and other types of wood that are heavy and can withstand repeated exposure to rain and strong wind are also suitable. The cover 36 is preferably laid on top of the top decking 31 of the interconnected dock sections as shown in FIGS. 2 and 4. To achieve the intended function of hinge 1, the front and back ends of the plywood preferably extend beyond the junction where the hinge 1 connects with the vertical faces 8 of the dock sections while the lateral side ends coterminally align with the lateral side ends of the dock sections as shown in FIGS. 1, 2, 3 and 4. The cover 36 is preferably shaped with an arched edge 37 on one end and a horizontal edge 38 on the other end.

The arched 37 and the horizontal 38 edges are beveled at approximately 15–30 degrees to prevent a user from tripping. The length of the beveled edges typically ranges from ¼ in. to 3 inches. The side of the cover with a horizontal edge 38 extends preferably by about 6 inches beyond the vertical face of the dock section and is bolted to the dock section as shown in FIG. 4. The arched end, likewise, extend beyond the vertical face of the opposite dock section but is not bolted to allow the cover 36 to move with the movement of the dock sections. However, to ensure that every point of the cover 36 contacts the surface of the articulating dock, the top 39 of the arched edge 37 is approximately 18 inches beyond the vertical face of the dock section located on the same side as the arched edge. This amount of overlap and the weight of the cover prevent the arched end from lifting away from the top decking 31 even if this end is not bolted. Also, as seen in FIG. 4, the arching starts from the lateral sides and extends through the entire width of the top deck.

The description herein purposely do not specify the dimensions of the hinge and its components because these vary according to the size of the dock sections to be interconnected. The example given will teach those in the art on how to proportionally adjust the dimensions for the particular application.

While the embodiment of the present invention has been described, it should be understood that various changes, modifications and adaptations may be made therein without departing from the spirit of the invention and the scope of the appended claims. Those skilled in the art will recognize that other and further variations of the features presented herein are possible. The scope of the present invention should be determined by the teachings disclosed herein, the appended claims and their legal equivalents.

I claim:

1. A hinge for interconnecting sections of a dock or for interconnecting walkways to a dock, comprising:

two flat stackable sheets of twisting members, each having an arcuate front end opposite a base for facilitating a twisting motion, a mounting plate at the base, and a central opening;

a pivot rod inserting through the central opening;

a fastener for keeping the hinge components together;

a grease zerk for greasing the hinge;

means for mounting the hinge to dock sections of a dock; and, means for rendering vertical pivotal movement of the dock sections.

2. The hinge of claim 1 further comprising a washer.

3. The hinge of claim 1 further comprising means for covering a gap formed by the hinge between interconnecting dock sections.

4. The hinge of claim 3 wherein the means for covering the gap is a marine plywood laid on top of the interconnecting dock sections having an unbolted beveled arched edge on one end and a bolted beveled horizontal edge on the other end, the beveled edges extending beyond the interconnected vertical faces of the dock sections; and, lateral side ends coterminally aligning with the lateral side ends of the dock sections.

5. The hinge of claim 1 wherein the means for rendering vertical pivotal movement of the dock is the mounting plate of one twisting member connecting to a dock joint bracket attached to a dock section and the mounting plate of the other twisting member connecting to a plain corner bracket attached to an opposite dock section.

6. The hinge of claim 1 further comprising means for preventing abrasion between contacting surfaces.

7. The hinge of claim 1 wherein the base of the stackable sheets is horizontal.

8. The hinge of claim 1 wherein the mounting plates are oriented perpendicular to the plane of the flat stackable sheets.

9. The hinge of claim 1 further comprising a gusset to reinforce the attachment of the mounting plates to the dock sections.

10. The hinge of claim 1 wherein the pivotal rod is a bolt.

11. The hinge of claim 1 wherein the fastener is a nut when the pivotal rod is a bolt.

12. The hinge of claim 1 further comprising a lifting bracket.

13. The hinge of claim 1 wherein the arcuate front of the stackable sheets have vertical sides extending diagonally at each end and terminating at the mounting plates.

14. A method for interconnecting dock sections that can withstand damage from strong wave current and wind, comprising:

a) stacking two flat sheets of twisting members resulting in an upper and a lower twisting member, each having an arcuate front end opposite a base, a central hole, and a mounting plate and orienting the mounting plate of the upper sheet opposite or away from the mounting plate of the lower sheet;

b) aligning the central hole of the upper and lower sheets of twisting members;

c) introducing a pivot rod through the aligned central holes;

d) fastening the stacked twisting members together thereby forming an assembled hinge;

e) greasing the assembled hinge through a grease zerk;

f) mounting the assembled hinge by attaching the mounting plate of one twisting member to a dock joint bracket attached to a dock section and the mounting plate of the other twisting member to a plain corner bracket attached to an opposite dock section; and, g) covering a gap, if formed by the hinge between the interconnected dock sections to prevent injury to users.

15. The method of claim 14 further comprising between step b) and c), placing a washer having a center hole on top of the upper twisting member in such a way that the center hole aligns with the central holes of the twisting members.

16. The method of claim 14 further comprising between step d) and e), placing a washer having a center hole at the bottom of the lower twisting member in such a way that the center hole aligns with the central holes of the twisting members.

* * * * *